United States Patent [19]

Vallance

[11] Patent Number: 4,892,774

[45] Date of Patent: Jan. 9, 1990

[54] INTERLEAFED FIBER-REINFORCED THERMOPLASTIC COMPOSITE

[75] Inventor: Michael A. Vallance, Schenectady, N.Y.

[73] Assignee: General Electric Company, Pittsfield, Mass.

[21] Appl. No.: 141,708

[22] Filed: Jan. 7, 1988

[51] Int. Cl.$^4$ ............... B32B 27/08; B32B 27/12; B32B 31/12

[52] U.S. Cl. .................... 428/174; 264/257; 264/258; 156/182; 156/222; 156/224; 156/306.6; 156/309.6; 156/308.2; 428/36.1; 428/36.2; 428/36.3; 428/36.4; 428/110; 428/111; 428/113; 428/175; 428/229; 428/246; 428/248

[58] Field of Search ............ 156/182, 222, 224, 306.6, 156/309.6, 308.2; 428/174, 175, 229, 246, 248, 251, 252, 264, 265, 267, 268, 272, 273, 286, 287, 290, 294, 408, 420, 542.8

[56] References Cited

U.S. PATENT DOCUMENTS

| | | |
|---|---|---|
| 2,465,319 | 3/1949 | Whinfield et al. . |
| 2,719,100 | 9/1955 | Banigan . |
| 3,047,539 | 7/1962 | Pengilly . |
| 3,357,874 | 12/1967 | Kennedy . |
| 3,798,116 | 3/1974 | Bassett et al. . |
| 3,969,176 | 7/1976 | Bassett et al. . |
| 4,041,206 | 8/1977 | Tsunashima et al. . |
| 4,314,002 | 2/1982 | Oizumi et al. . |
| 4,373,002 | 2/1983 | Petersen . |
| 4,384,016 | 5/1983 | Ide et al. ............... 156/308.2 |
| 4,539,253 | 9/1985 | Hirschbuehler et al. . |
| 4,556,688 | 12/1985 | McCready et al. . |
| 4,715,919 | 12/1987 | Fakirov et al. ............... 428/420 |

OTHER PUBLICATIONS

Hobbs et al., *Polymer Bulletin,* 17, pp. 335–339 (1987).

*Primary Examiner*—James C. Cannon
*Attorney, Agent, or Firm*—Hedman, Gibson, Costigan & Hoare

[57] ABSTRACT

Disclosed are interleafed fiber-reinforced thermoplastic composites formed by introducing a ductile interleaf block copolymer layer to a fiber-reinforced thermoplastic layer. Also disclosed are methods for producing such composites. These composites are useful in numerous applications where toughness, impact strength and resistance to delamination are desirable.

38 Claims, 1 Drawing Sheet

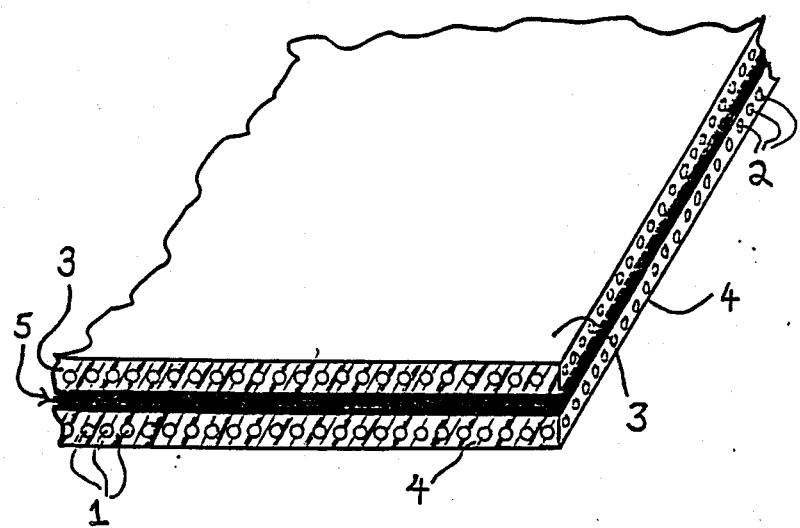

INTERLEAFED FIBER-REINFORCED THERMOPLASTIC COMPOSITE

This invention relates to thermoplastic composite laminates with ductile interleaves. More particularly, it concerns laminates in which the the complimentary thermoplastic resins and interleaf copolymer resins are compatibilized to produce an integral, layered composite.

BACKGROUND OF THE INVENTION

The production of light weight, shaped objects, such as auto body parts, which have high impact strength, that can be laid up or molded into complex shapes, and that will retain dimensional stability over a wide variety of use conditions has been an enduring goal of plastics researchers and manufacturers for several decades. Recently, great advances towards this goal have been made using reinforced plastics or composites, in which two or more layers of resinous sheeting, sometimes using fibrous reinforcement, are laminated together to form a laminated composite wherein the physical properties of the resulting laminate exceed what would be expected considering the properties of the individual layers.

Some of the most encouraging results have been achieved with laminates employing reinforced resin layers in conjunction with an unreinforced layer of a different resin. In the area of high performance composites, i.e., as for aircraft panels, U.S. Pat. No. 4,539,253, to Hirschbuehler, et al, discloses an interleafed fiber resin matrix composition wherein a reinforced thermoset epoxy resin sheet is layered with a fiber-reinforced interleaf resin including a thermoset epoxy and a rubbery vinyl addition polymer.

U.S. Pat. No. 2,719,100 to Banigan discloses a process for heat-sealing thermoplastic laminates, that is, bonding together (by heat) the component layers of thermoplastic films, e.g., poly(ethylene terephthalate), PET, by interposing a substantially amorphous thermoplastic film between adjacent layers of tensilized, i.e., stretched, film to be heat-sealed. The heat-sealing process results in a strong, light-weight bonded film useful for packaging. However, because the process requires tensilization to make the laminated film, it is difficult to produce such films having a thickness substantially greater than 0.007" in a continuous type of stretching apparatus. Thus, thickness is a limiting factor.

Kennedy, in U.S. Pat. No. 3,357,874, describes a process for laminating polyester films and other "addends" onto the surface of a shaped polyester article by treating the surface with an acid wash (e.g., 85% sulfuric acid), to leave the surface in an amorphous condition. When the amorphous surface of the film is brought into contact with an addend material, a laminate is formed having a strong interface adhesion between the component layers. However, the use of an acid treatment is costly and makes the substrates difficult to handle.

U.S. Pat. Nos. 3,798,116 and 3,969,176, to Bassett, et al, describe a method for preparing bonded polyester films having a bead type heat seal between the plies of the composite film.

U.S. Pat. No. 4,041,206, to Tsunashima, et al, teaches that PET or poly(butylene terephthalate), PBT, films can be laminated directly to a crystalline poly(butylene terephthalate) or poly(hexylene terephthalate) copolyester blended with 10-40 weight percent PET or PBT, said copolyester containing 50-80 mole percent terephthalic acid units. The resulting films are transparent, tough, slippery and have excellent heat-adhesive properties, making them useful in general packaging, photographic films and electrical insulation. However, no mention is made of the suitability of this system for reinforced, dimensionally stable objects.

U.S. Pat. No. 4,314,002 to Oizumi, et al, discloses circuit board laminates comprising alternating fiber-reinforced curable thermoset resin layers and unreinforced cured resin layers in which the same or a different resin may be used in both types of layers. The reinforced layers, e.g., linter paper or kraft paper impregnated with a thermoset resin, are separated by cured resin layers, forming an integral laminate in which voids between layers due to contraction during curing are eliminated.

U.S. Pat. No. 4,373,002 to Peterson-Hoj discloses a heat-sealable laminated material comprising a layer of stretched crystalline polyester and a layer of cyclohexane-modified, heat-sealable amorphous polyester material, which layers are joined by lamination or coextrusion and then subjected to a joint stretching operation. The resulting laminate is heat-sealable and also exhibits high tensile strength.

The foregoing patents demonstrate that considerable work has been done in the area of resin laminates, both reinforced and unreinforced, which obtain advantageous properties by promoting, in various ways, close bonding between the respective layers, to give an integral composite. There is still a strong need, however, for reinforced composites utilizing thermoplastic resins to produce articles having high impact strength.

It has now been surprisingly discovered that unique, interleafed fiber-reinforced thermoplastic composites can be formed using layers of a fiber-reinforced thermoplastic resin separated by layers of a ductile thermoplastic interleaf copolymer resin. The composites of the present invention are distinguished from foregoing composites in that the interleaf block copolymer resin is compatible with the fiber-reinforced thermoplastic resin so as to undergo a co-crystallization or co-vitrification, resulting in chemical interlayer bonding which has not been seen in prior art laminates. Such co-crystallization is achieved without any of the surface treatment techniques (acid treatment, tensilization, precuring, etc.) seen in prior processes.

The interleaf copolymer resin forms a ductile, tough, rubbery layer, and, in the final composite of the invention, will form a diffuse interface with the fiber-reinforced, or "binder", resin. The final thermoplastic composites have high impact strength and high resistance to delamination.

While not intending to be bound by any theory of operation, it is believed that the following factors may be important in providing the advantageous results obtained with the present invention:

(i) Adhesion between the reinforced substrate and the interlayer occurs because the binder resin in the substrate and the hard blocks (hereinafter (a)) in the block copolymer of the interlayer mix with a negative Gibbs free energy. This may be a consequence of a co-crystallizability or of some other thermodynamic driving force, such as negative mixing enthalpy or positive entropic energy.

(ii) The soft blocks (hereinafter (b)) in the block copolymer of the interlayer always have low Tg, in fact always less than 25° C. and typically less than 50° C.

This does not guarantee that they will be incompatible with the binder resin in the composite substrate, thus demixing during cool down. They must be chosen on rigorous thermodynamic considerations to insure demixing.

DESCRIPTION OF THE DRAWING

The drawing illustrates in perspective view a detail of an interleafed, fiber-reinforced thermoplastic composite of this invention, showing the different layers included therein.

SUMMARY OF THE INVENTION

Provided in acccordance with the present invention are laminated fiber-reinforced thermoplastic composites comprising:

(1) at least one fiber-reinforced layer comprising reinforcing filaments coated with at least one thermoplastic binder resin, and on at least one surface of said fiber-reinforced layer, (2) at least one interleaf layer comprising a block copolymer resin comprising polymer segments of
   (a) at least one thermoplastic resin co-crystallizable or co-vitrifiable with said binder resin, and
   (b) at least one co-resin having a glass transition temperature (Tg) substantially lower than said co-crystallizable thermoplastic resin.

Also contemplated herein is a process for producing laminated fiber-reinforced thermoplastic composites comprising:

(1) forming a fiber-reinforced thermoplastic resin substrate comprising fibrous reinforcement coated with at least one thermoplastic binder resin, (2) introducing on at least one surface of said substrate an interleaf layer comprising a block copolymer resin comprising polymer segments of
   (a) at least one thermoplastic resin co-crystallizable or co-vitrifiable with said binder resin, and
   (b) at least one polymer having a Tg substantially lower than said co-crystallizable resin, and (3) consolidating said fiber-reinforced substrate and said interleaf layer under sufficient heat and pressure to effect co-crystallization or co-vitrification of said thermoplastic co-crystallizable resin at the interface between said substrate and said interleaf layer, such that an integral composite is obtained.

DETAILED DESCRIPTION OF THE INVENTION

The novel thermoplastic composites of this invention use complementary pairs of thermoplastic resins, which can be engineered to make integral, tough, fiber-reinforced, thermoplastic laminates with ductile interleaf layers. It is known that layers of a ductile resin included between fiber-reinforced plies of a composite can augment the survivability of such composites during transverse impact loading or other deformation modes associated with interply delamination. However, the exact nature of the resin, the thickness of the interleaf layer, and the quality of the bonding at the interface between the interleaf layer and other layers of the laminate are critical to the successful performance of the finished composite. In the present invention, for the first time, continuous interlayer co-crystallization or co-vitrification leads to a type of diffuse chemical bond between the reinforced layers and the interleaves, giving the finished composites of the present invention exceptional resistance to transverse impact loading and resistance to shear and chemical delamination.

The thermoplastic resins in the ductile interleaves and the binder resins of the reinforced layers must be "complementary," i.e., the binder resin and at least one segment of the interleaf copolymer must be diffusible in one another in the molten state, and upon crystallization or vitrification of the binder resin and the co-diffusible interleaf copolymer segment, they form a diffuse, continuous interlayer bond. The interleaf copolymer must also include non-diffusible segments, which will prevent the total dissolution of the interleaf resin into the binder layer, thus maintaining the interleaf as a separate, ductile layer even with substantial intermixing (co-diffusion) of the binder resin and other co-polymer segments. It is not critical that either the binder resin or the co-diffusible components of the interleaf copolymer be crystallizable resins, as long as the two polymers exhibit a high degree of chemical compatibility, resulting in a diffuse, continuous interlayer. The term "co-crystallization", when referring to the interaction and bonding between the binder resin and the co-diffusible segments of the interleaf copolymer, is expressly intended to cover not only cases where both components are co-crystallizable, but also cases where they are co-vitrifiable due to other thermodynamic considerations.

The binder resin and interleaf copolymer may be selected from a wide variety of known resins that would be complementary as described above, or may be specifically synthesized with laminated composites of the present invention in mind. Among such resins, given illustratively, are aromatic polyesters, polyamides and polyurethanes. The polyesters preferred for use herein include poly(1,4-butylene terephthalate) and poly(ethylene terephthalate) with minor amounts of polyesters derived from an aliphatic or cycloaliphatic diol, or mixtures thereof, containing from 3 to about 10 carbon atoms and at least one aromatic dicarboxylic acid. Preferred polyesters are derived from an aliphatic diol and an aromatic dicarboxylic acid have repeating units of the following general formula:

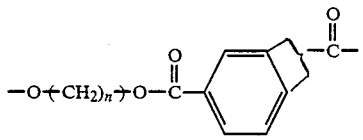

wherein n is an integer, preferably 2 or 4, e.g., poly(1,4-butylene terephthalate).

Also contemplated herein are the above polyesters with additional amounts of polyols and/or acids in the amounts of from 0.5 to-50 weight percent based on the total resin composition. The acids can be aliphatic or cycloaliphatic with the number of carbon atoms covering the same range. Polyalkylene ether glycols can also be used where the alkylene portion has from 2 to 10 carbon atoms and the entire glycol portion varies in molecular weight from 100 to 10,000. All such polyesters can be made following the teachings of, for example, U.S. Pat. Nos. 2,465,319, 3,047,539 and 4,556,688.

When employed as the binder resin for a composite to be used in the temperature range of from about −40° to about +150° C., PBT exhibits a combination of modulus and toughness which make it particularly preferred.

In forming the composites of this invention, the binder resin, which may be crystalline or semi-crystalline or amorphous, is juxtaposed with a suitable fibrous reinforcement, e.g., a fabric, roving, yarn, tow, mat or tape of unidirectionally aligned continuous reinforcing filaments. The reinforcement can comprise a wide variety of materials including but not limited to carbon, glass, graphite, cellulose, polyaramid, silicon carbide, boron, polyester, rayon, polybenzimidazole, polybenzothiazole and metal-coated polybenzothiazole.

For sheet-like laminates according to the invention, the reinforcing material will preferably be woven into a fabric or a flat, non-woven mat. Preferred as a reinforcing fabric of high strength reinforcing filaments is MAGNAMITE® A370 (Hercules, Inc.), a balanced 8-harness satin weave of 3000-count tows of Hercules MAGNAMITE® AS4, high strength carbon fibers. The fibrous reinforcement is juxtaposed with the binder resin by any of a number of well known methods, such as coating, dipping, spraying, co-extrusion, wetting, etc. For the purposes herein, the term "coating" will encompass all known methods by which the reinforcement and binder resin are permanently juxtaposed, this includes embodiments wherein the fibrous reinforcement is surface coated, as well as instance wherein the fibrous reinforcement, in whatever form, is thoroughly coated and impregnated with the binder resin. In cases where the binder resin is in the form of a sheet or film, it is preferred to layer the fibrous reinforcement with the binder resin film and join the resin and reinforcement components under pressure, with heat if desired, e.g., 50°–300° C.

In preparing the interleaf film copolymer, the thermoplastic resin segment can comprise a number of polymers, including by way of example, aromatic polyesters, polyamides and polyurethanes. Almost any kind of thermoplastic resin is suitable for incorporation into the interleaf copolymer, provided it is complementary with the binder resin, that is to say, they are mutually co-diffusible in the amorphous state and are co-crystallizable or co-vitrifiable as defined above.

The second polymer segment of the interleaf copolymer can also comprise a number of compounds. Typically, this polymer will have a glass transition temperature, Tg, substantially lower than the interleaf copolymer segment which is codiffusible with the binder resin. This "elastomeric" copolymer segment, the "soft" segment is selected to be phase separable from the "hard" blocks preventing total dissolution of the interleaf into the binder resin at lamination temperatures, ensuring the presence of a distinct interleaf layer. Preferred as interleaf copolymers are poly(etherimide esters), such as General Electric Company's LOMOD® J resin and copolymers of PBT and polytetrahydrofuran (PTHF), such as DuPont's HYTREL® thermoplastic elastomer. Segment length and overall degree of polymerization of the interleaf copolymer may be varied by known techniques, in order to obtain particular desired properties.

In a preferred embodiment, PBT of the formula

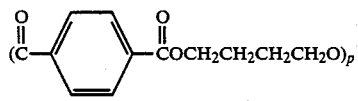

is employed as the binder resin coating a fabric or mat of reinforcing filaments, and an interleaf copolymer film comprising segmented PBT and PTHF is employed having the formula

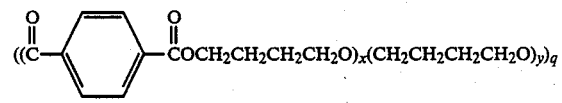

where p, q, x and y are variables adjusted to obtain an appropriate balance between modulus, ductility and toughness. Because the PBT segments of the copolymer can co-crystallize with the PBT binder resin and due to interlayer-diffusion of PBT components in the binder resin and the copolymer, the interface between them is broadened by diffusion at lamination temperatures above the melting point of PBT, and a continuous interlayer adhesion is promoted. At the same time, the PTHF segments in the copolymer prevent the total dissolution of the interleaf resin into the binder resin, due to a positive heat of solution between the dissimilar species.

The interleaf copolymer may also be prepared using conventional methods known to those skilled in the art. The copolymer may be advantageously extruded as a fil with a particular desired thickness or may be thinned to a lesser thickness using a conventional compression molding press.

Temperatures and pressure for forming the thermoplastic interleafed composites will be varied according to the selected resin and targeted application.

The fiber-reinforced thermoplastic layer and interleaf film copolymer can be joined using techniques well known in the art, such as lamination, casting, coating, or spraying the interleaf onto a reinforced fiber-resin substrate.

For laminated, panel-like composites of this invention, any sequence of fiber-reinforced thermoplastic sheets and interleaf copolymer film can be used. That is to say, the layers can be laid up in alternating layers, in any orientation, to any number of desired layers. As one illustration, given in the drawing, three plies are depicted. The corner of a sheet-like composite according to the invention is depicted, wherein a woven fabric of reinforcing filaments is used as the fibrous reinforcement. The filaments of warp 1 are interwoven to form a sheet with the filaments of weft 2, and are coated with binder resin, e.g., PBT, to form integral fiber-reinforced layers 3 and 4. Interlayer film 5 is sandwiched between reinforced layers 3 and 4, and after consolidation under pressure, an integral composite is formed. The reinforced layers may be arranged in any orientation to take advantage of the physical properties of the reinforcing filaments or the physical characteristics of the weave, in the case of a woven reinforcing fabric. Those skilled in the art will appreciate the wide variety of layups that are contemplated by the present invention.

DESCRIPTION OF THE PREFERRED EMBODIMENTS

The following examples illustrate the novel methods and composites of the present invention and are not to be construed to limit the scope of the appended claims in any manner.

Preparation of Fiber-Reinforced Sheets

A fiber-reinforced thermoplastic sheet was prepared using poly(1,4-butylene terephthalate), VALOX® 310, General Electric Company, as the binder resin and woven high strength, high modulus carbon fibers,. MAGNAMITE ® A370, Hercules, Inc., as the reinforcing substrate. MAGNAMITE ® A370 is a balanced 8-harness satin weave of 3000-count tows of MAGNAMITE ® AS4 high strength, carbon fibers. The carbon fiber fabric was heated to 450° C. in flowing nitrogen to remove any sizing.

A fiber-resin composite sheet was prepared using carbon fiber fabric cut to 14.0×11.4 cm in size. The swatches were cut with the sides parallel to the warp and weft of the fabric. The 14.0 cm dimension was always parallel to the warp direction. Because of the particular weave, the front and back sides of the fabric appeared differently, with one side having fibers primarily in the warp direction. This side was designated the "strong" side; the other side was designated as the "weak" side.

A symmetric lay-up using four layers of carbon fiber fabric and two extruded film layers of the PBT resin was assembled. The average PBT film thickness was 0.0337 cm. The six layers, viewed from the top, were assembled in a matched-die, positive-pressure, tool-steel mold in the following sequence: fabric (weak)/PBT film/fabric (weak)/ fabric (strong)/PBT film/fabric (strong). The inner mold walls were treated with FREKOTE ® 44 mold-release agent according to the manufacturer's instructions.

The cold mold was placed between the platens of a 445 kN press (Pasadena Hydraulics Inc.). The platens were made to lightly clamp the mold for positive heat transfer. To facilitate rapid heating, the platens were preheated electrically to 260° C. When the mold temperature, according to an embedded thermocouple, had reached 200° C., compressive loading was introduced gradually until 250° C., when the maximum force of 18 kN was reached. The hot mold was quickly transferred to a Wabash high-production press with water-cooled platens, where the mold was allowed to cool under load control at 19 kN. After cooling, the composite was removed from the mold.

The resultant fiber-resin composite sheet had glossy, smooth surfaces. When dropped on a hard surface, the composite produced a glassy ring. A section was taken using a Buehler saw, and the section was embedded in potting epoxy and polished using standard metallurgical polishing techniques. There was complete wetting of the fabric surface and no interfacial cracking.

Another section was cut and treated at 500° C. in flowing nitrogen to ash the binder resin. The fiber weight fraction was 74.4%. Differential scanning calorimetry on shaved composite fragments indicated the resin in the PBT composite to be 36.2% crystalline. Combining these measurements, the fiber volume fraction was calculated to be 67.6%.

Preparation of an Interleaf Film

An interleaf film was prepared from a thermoplastic elastomer, copoly(ethermide ester), LOMOD ® B-200 (General Electric Company). The thermoplastic elastomer was an extruded film with an average thickness of 0.036 cm. Sections of film were thinned down to about 0.011 cm using 222 kN of force in the 445 kN Pasadena Hydraulics press. The film was placed between heavy gage aluminum foil sheets coated with polytetrafluoroethylene (PTFE), also known as Dupont's TEFLON ® resin, the platens were preheated to 190° C., and the foil/film/foil sandwich was left under load for 100 seconds.

EXAMPLE 1

Three thin fiber-reinforced PBT composite sheets were made according to the above procedure, except that each composite was made from two carbon-fiber swatches and one PBT film. The swatches were oriented weak/strong and the stacking sequence was fabric/film/fabric. The three thin composites were interleaved in a cold matched-die, positive-pressure mold with three of the pre-thinned poly(etherimide ester) films in the following unsymmetrical sequence: composite/interleaf/composite/interleaf/composite/interleaf. The molding conditions were the same as used to produce the fiber resin composite sheets.

The laminated composite plaque obtained had a smooth, high-gloss surface finish. The plaque was found to contain approximately 15% poly(etherimide ester) by volume. A glassy ring was produced by dropping the plaque on a hard surface.

Specimens of the PBT/poly(etherimide ester) laminated composite laminates were placed in 1,1,2-trichloroethane at 25° C. The poly(etherimide ester) dissolved very quickly whereas the PBT showed no apparent solution after several hours. An embedded and polished section of the laminated composite was exposed to circulating 1,1,2-trichloroethane at 25° C. for several hours, then dried in air. Microscopic examination revealed long thin areas, outside of the flattened, impregnated fiber tows, where the unreinforced poly(etherimide ester) had been extracted. A polished section was examined before trichloroethane extraction showed no evidence of delamination between the interleaf regions and the impregnated carbon fiber fabric.

The above-mentioned patents are incorporated herein by reference.

Many obvious variations will suggest themselves to those skilled in the art in light of the above detailed description. For example, instead of using poly(1,4-butylene terephthalate) as the thermoplastic resin, other resins, e.g., polyamide or polyurethane, can be used. Instead of fabric comprising reinforcing carbon fibers, other fibers, such as glass, cellulose, graphite, polyaramide, silicon carbide, boron, polyester, rayon, polybenzimidazole, polybenzothiazole, metal coated poly(benzothiazole) or mixtures of any of the foregoing can be substituted. In the place of the complementary thermoplastic resin of the interleaf copolymer, other resins can instead be employed as long as they are co-diffusible and co-crystallizable or co-vitrifiable with the thermoplastic binder resin. For the polymer (b) used in the interleaf copolymer, other polymers, instead of poly(ethermide ester), can be employed so long as the interleaf copolymer as a whole leads to the formation of the impact and delamination resistant, integral composites such as described above. Instead of laminating the plies and interleaf films to form planar laminates, the interleaf can be introduced onto the reinforced thermoplastic ply by casting, coating or spraying, and shaped articles of two or multiple layers can be made.

All such variations are within the full intended scope of the appended claims.

I claim:

1. An interleafed fiber-reinforced thermoplastic composite comprising:
   (1) at least one fiber-reinforced layer comprising reinforcing filaments coated with at least one thermoplastic binder resin, and on at least one surface of said fiber-reinforced layer, (2) at least one interleaf layer comprising a block copolymer resin comprising polymer segments of
   (a) at least one thermoplastic resin co-crystallizable or co-vitrifiable with said binder resin, and
   (b) at least one co-resin having a glass transition temperature substantially lower than said segment (a).

2. A composite as defined in Claim 1 wherein the composite comprises multiple alternating fiber reinforced and interleaf layers.

3. A composite as defined in Claim 1 wherein the composite is shaped.

4. A composite as defined in claim 1 wherein said thermoplastic binder resin is selected from aromatic polyester, polyimide, polycarbonate, polyamide and polyurethane, or mixtures thereof.

5. A composite as defined in claim 4 wherein said thermoplastic binder resin comprises an aromatic polyester.

6. A composite as defined in claim 5 wherein said aromatic polyester is poly(1,4-butylene terephthalate).

7. A composite as defined in claim 1 wherein said reinforcing filaments are selected from cellulose, carbon, glass, graphite, polyaramide, silicon carbide, boron, rayon, polybenzimidazole, polybenzothiazole, and metal-coated polybenzothiazole filaments, or combinations of any of the foregoing.

8. A composite as defined in claim 7 wherein said reinforcing filaments are in the form of a fabric, mat, tow, roving, braid or unidirectional alignment.

9. A composite as defined in claim 1 wherein the thermoplastic resin segment (a) of the interleaf copolymer is selected from aromatic polyester, polyimide, polycarbonate, polyamide and polyurethane.

10. A composite as defined in claim 9 wherein said thermoplastic resin segment (a) comprises an aromatic polyester.

11. A composite as defined in claim 10 wherein said aromatic polyester comprises poly(1,4-butylene terephthalate).

12. A composite as defined in claim 1 wherein said co-resin segment (b) of the interleaf copolymer is selected from poly(etherimide ester) or poly(alkylene ether ester).

13. A composite as defined in claim 12 wherein said co-resin segment (b) comprises poly(etherimide ester).

14. A composite as defined in claim 12 wherein said co-resin segment (b) comprises poly(alkylene ether ester).

15. A composite as defined in claim 14 wherein said poly(alkylene ether ester) comprises poly(tetramethylene ether terephthalate).

16. A composite as defined in claim 1 wherein said interleaf copolymer comprises poly(1,4-butylene terephthalate-co-ethermide ester).

17. A composite as defined in claim 1 wherein said interleaf copolymer comprises poly(1,4-butylene terephthalate-co-tetramethylene ether).

18. A composite as defined in claim 1 wherein said thermoplastic binder resin comprises poly(1,4-butylene terephthalate), said reinforcing filaments are carbon fibers, and said interleaf copolymer comprises poly(1,4-butylene terephthalate-co-etherimide ester).

19. A process for preparing an interleafed fiber-reinforced thermoplastic composite comprising:

(1) forming a fiber-reinforced thermoplastic resin substrate comprising fibrous reinforcement coated with at least one thermoplastic binder resin, (2) introducing on at least one surface of said substrate an interleaf layer comprising a block copolymer resin comprising polymer segments of
   (a) at least one thermoplastic resin which is either (i) co-crystallizable or (ii) co-vitrifiable with said binder resin, and
   (b) at least one polymer having a glass transition temperature substantially lower than said segment (a), and (3) consolidating said fiber-reinforced substrate and said interleaf layer under sufficient heat and pressure to effect either (i) co-crystallization or (ii) co-vitrification of said thermoplastic co-crystallizable or co-vitrifiable resin at the interface between said substrate and said interleaf layer, such that an integral composite is obtained.

20. A process as defined in claim 19 wherein the integral composite comprises multiple alternating fiber-reinforced and interleaf layers.

21. A process as defined in claim 19 wherein the integral composite is shaped.

22. A process as defined in claim 19 wherein said thermoplastic binder resin is selected from aromatic polyester, polyimide, polycarbonate, polyamide and polyurethane, or mixtures thereof.

23. A process as defined in claim 22 wherein said thermoplastic binder resin comprises an aromatic polyester.

24. A process as defined in claim 23 wherein said aromatic polyester is poly(1,4-butylene terephthalate).

25. A process as defined in claim 19 wherein said reinforcing filaments are selected from cellulose, carbon, glass, graphite, polyaramide, silicon carbide, boron, rayon, polybenzimidazole, polybenzothiazole, and metal-coated polybenzothiazole filaments, or combinations of any of the foregoing.

26. A process as defined in claim 25 wherein said reinforcing filaments are in the form of a fabric, mat, tow, roving, braid or unidirectional alignment.

27. A process as defined in claim 19 wherein the thermoplastic resin segment (a) of the interleaf copolymer is selected from aromatic polyester, polyimide, polycarbonate, polyamide and polyurethane.

28. A process as defined in claim 27 wherein said thermoplastic resin segment (a) comprises an aromatic polyester.

29. A process as defined in claim 28 wherein said aromatic polyester comprises poly(1,4-butylene terephthalate).

30. A process as defined in claim 19 wherein said co-resin segment (b) of the interleaf copolymer is selected from poly(etherimide ester) or poly(alkylene ether ester).

31. A process as defined in claim 30 wherein said co-resin segment (b) comprises poly(etherimide ester).

32. A process as defined in claim 30 wherein said co-resin segment (b) comprises poly(alkylene ether ester).

33. A process as defined in claim 32 wherein said poly(alkylene ether) comprises poly(tetramethylene ether terephthalate).

34. A process as defined in claim 19 wherein said interleaf copolymer comprises poly(1,4-butylene terephthalate-co-ethermide ester).

35. A process as defined in claim 19 wherein said interleaf copolymer comprises poly(1,4-butylene terephthalate-co-tetramethylene ether).

36. A process as defined in claim 19 wherein said thermoplastic binder resin comprises poly(1,4-butylene terephthalate), said reinforced filaments are carbon fibers, and said interleaf copolymer comprises poly(1,4-butylene terephthalate-co-etherimide ester).

37. A process as defined in claim 19 wherein said fiber-reinforced thermoplastic substrate is formed by laminating a thermoplastic resin film on said fibrous reinforcement.

38. A process as defined in claim 19 wherein said interleaf copolymer forms a film and is introduced to the fiber-reinforced substrate by lamination.

* * * * *